Patented June 21, 1938

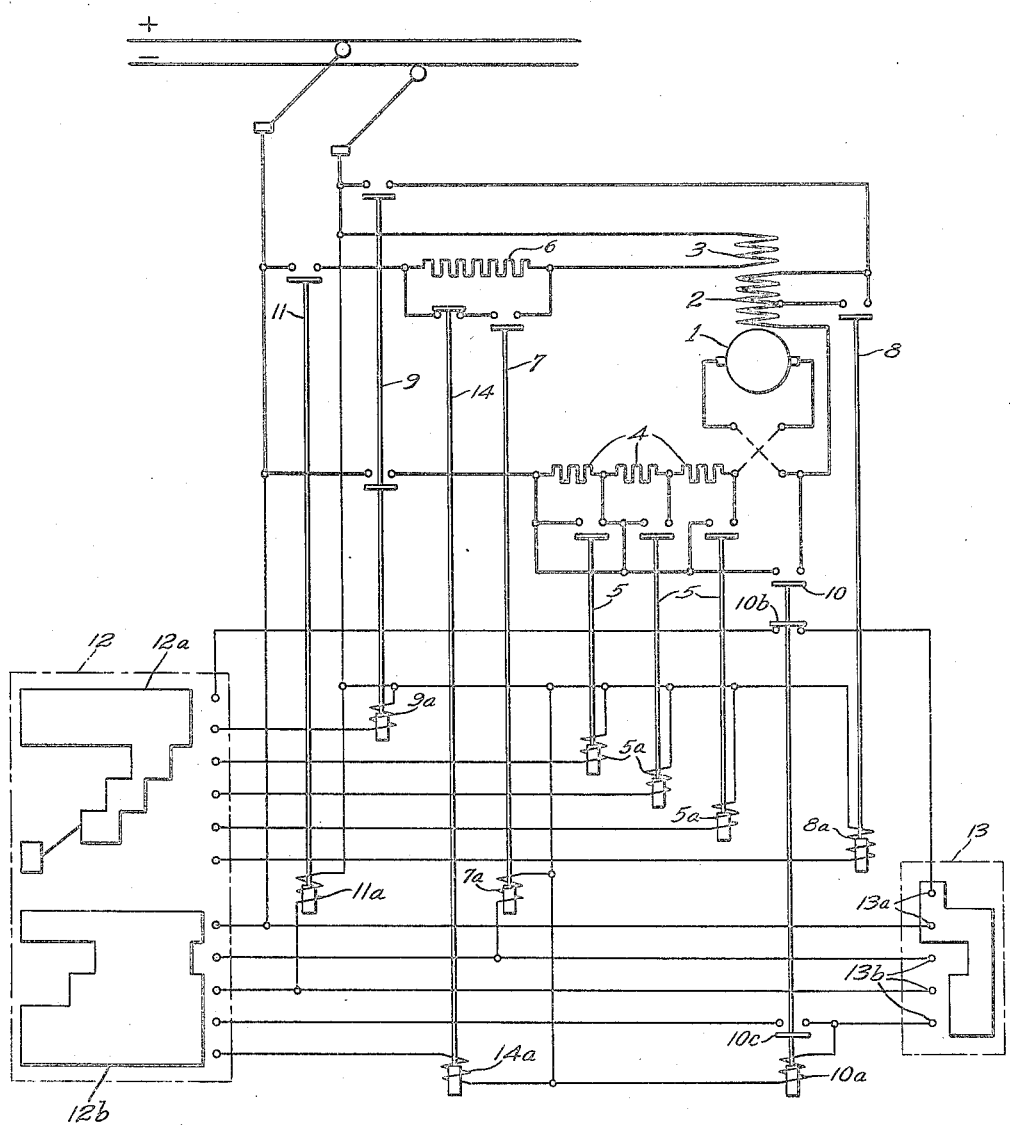

2,121,605

UNITED STATES PATENT OFFICE 2,121,605

ELECTRIC TRACTION MOTOR CONTROL SYSTEM

Paul Lester Mardis and Eric Alton Binney, Ilkley, England, assignors to The English Electric Company Limited, London, England, a company of England Application April 14, 1937, Serial No. 136,892
In Great Britain May 15, 1936

7 Claims. (Cl. 172—179)

This invention relates, in general, to motor control systems and, more particularly, to a control system for an electrically propelled vehicle having one controller for controlling acceleration of the traction motor or motors and a separate controller for controlling rheostatic braking, i. e., braking by disconnecting the armature from the supply and connecting a braking resistance across it.

The invention is particularly applicable to electric trolley buses, the two controllers then being pedal operated, and has for its object the prevention of the application of power to the traction motor under unfavorable conditions.

The brake controller when operated interrupts the circuits controlled by the power controller or at least sufficient of these circuits to render the power controller ineffective. Thus rheostatic braking can be introduced at any time by depressing the pedal for the brake controller. Should, however, the power control pedal be kept depressed and the brake pedal then released, there is a risk, unless special precautions are taken, that power conditions may be restored to the motor with, for example, the starting resistance or the greater part of it cut out of circuit or the fields weakened or with other conditions unfavorable to switching the motor directly across the line. With the object of guarding against this, the present invention consists in the addition of electrical interlocking means for preventing a return to power conditions until both controllers have been returned to the "off" position.

In practicing the invention a brake contactor energized by the brake controller is maintained by the power controller until the latter is returned to the off position and is arranged to interrupt such of the other circuits of the power controller as are necessary to render this controller ineffective. Thus the braking contactor cannot be deenergized and power conditions restored until the power pedal as well as the brake pedal is first brought to the off position.

The invention is particularly applicable to an equipment employing motors having very powerful series field windings which are provided with tappings diverting resistances or other weakening means for the purpose of controlling the vehicle speed. With this type of motor the braking controller preferably governs means for producing a constant excitation independent of the armature current during rheostatic braking with or without further means for causing the excitation to vary inversely as the armature current.

In the traction motor control equipment shown in the single figure of the accompanying drawing by way of example of the invention, the motor, with armature 1 and tapped series field winding 2, has an auxiliary field winding 3 which is excited from the mains for the purpose of supplying the main excitation during rheostatic braking and which is also used as a shunt field during starting. A starting resistance 4 and contactors 5 therefor are provided in the armature circuit and a regulating resistance 6 with one or more contactors 7 therefor in the circuit of the field winding 3. One or more contactors 8 short circuit sections of the series field winding 2 for accelerating the motor. For rheostatic braking the main contactors 9 are opened while the braking contactor 10 is closed to connect the resistance 4 across the armature.

The drum type main controller 12, which is pedal operated in the case of a trolley bus, has two sets of drum contacts insulated from each other. One of these, the set of contacts 12a, is adapted as the pedal is depressed to close in succession circuits for the operating coils 9a of the positive and negative line contactors 9 for coils 5a for the contactors 5 for cutting out the starting resistance 4 in a plurality of steps and, lastly, for one or more coils 8a for contactors 8 for weakening the series field winding. The common feed to all these circuits is taken from the positive line through two sets of contacts in series, of which contacts 13a are closed only when the rheostatic brake controller 13 is in the off position and contacts 10b only when the rheostatic braking contactor 10 is in the deenergized position. This feed comes to the top stationary contact finger of the controller.

The other set of contacts 12b of the controller 12 is fed directly from the positive line and closes the circuits, as soon as the accelerating pedal is depressed, of the coils 11a and 7a for the contactors 11 and 7, respectively, for closing the circuit of and for short-circuiting resistance in series with the auxiliary or shunt field winding 3. On further movement of the controller and after the starting resistance has been cut out but before the series field is weakened, these contactors are opened one by one to weaken and finally open the circuit of the shunt field.

The braking controller 13, when operated, first of all opens the contacts 13a already described which interrupt the common feed to the principal circuits established by the accelerating controller 12. The brake controller includes further contacts 13b which can be closed in succession for establishing a circuit directly from the positive line through the coil 10a of the rheostatic braking contactor 10 and through the previously mentioned contactor coils 7a and 11a governing the auxiliary field winding 3. Thus further movement of the rheostatic brake controller first of all energizes the braking contactor 10 and connects the auxiliary field winding 3 across the line and then strengthens this auxiliary field. The rheostatic braking contactor 10 connects some or, as shown, all of the starting resistance 4, with or without extra resistance as desired, across the armature 1. If desired, some part of the motor series field winding 2 may also be included in this circuit in such a sense that it opposes the excitation produced by the field winding 3 and gives a resultant excitation which varies inversely as the armature current during braking, as described and claimed in the copending application of E. A. Binney and P. L. Mardis, Serial No. 135,485, filed April 7, 1937. The rheostatic braking contactor 10 as previously mentioned also includes the contacts 10b which interrupt certain principal circuits established by the accelerating controller 12 and a further auxiliary contact 10c which can prepare or complete a holding circuit for the contactor coil 10a in parallel with the contacts on the braking controller. If accelerating and rheostatic braking pedals be simultaneously depressed the set of contacts 12a on the accelerating controller will be rendered ineffective while the other set 12b will close circuits— also closed by the brake controller 13—to the contactor coils 7a and 11a governing the auxiliary field 3. The set of contacts 12b also establishes a feed to the normally closed contacts 10c on the rheostatic braking contactor so that the latter, once closed, will maintain itself energized independently of the position of the brake controller 13 so long as the accelerating pedal is depressed. Before power conditions can be restored it is thus necessary not only for the brake pedal to be released but also for the accelerating pedal to be released and the accelerating controller to be brought back to the off position so that the rheostatic braking contactor coil 10a is deenergized and the feed to the main circuits governed by the accelerating controller is reestablished by reclosure of the contacts 10b of the rheostatic braking contactor.

It is a further feature of the invention to provide means for increasing the resistance in or interrupting the circuit of the auxiliary field winding 3 of the motor on over voltage during either power or braking conditions. To this end, a contactor 14 has its coil 14a—of which the circuit is closed by the contacts 12b of the accelerating controller—so designed as to operate the contactor only on abnormal voltage; this contactor 14 is adapted either to interrupt the circuit of the auxiliary field winding 3 or, as shown, to insert some of the ordinary control resistance 6 therein.

Overload relays and other auxiliary features not shown will however be included in the equipment in the usual manner.

It will be understood from the foregoing how the invention may be applied to other forms of equipment for the control of augmented series field or of compound wound or other traction motors.

We claim as our invention:

1. Means for controlling an electric traction motor comprising, in combination, a power controller, a controller independently operable to introduce rheostatic braking irrespective of the position of the power controller, and electrical interlocking means for preventing a transition from rheostatic braking to power conditions until both controllers have been returned to a predetermined position.

2. Means for controlling an electric traction motor comprising, in combination, a power controller, a contactor for establishing a power circuit for the motor, a controller independently operable to introduce rheostatic braking irrespective of the position of the power controller, and electromagnetic means energized by actuation of the braking controller and maintained by the power controller, said means interrupting the energizing circuit of said contactor in the power circuit for the motor to prevent a transition from rheostatic braking to power conditions until both controllers have been returned to a predetermined position.

3. Means for controlling an electric traction motor comprising, in combination, a power controller, a controller independently operable to interrupt power conditions and introduce rheostatic braking irrespective of the position of the power controller, and means actuated by the power controller to maintain rheostatic braking conditions until the power controller is returned to a predetermined position.

4. Means for controlling an electric traction motor comprising, in combination, a power controller for establishing power operating circuits, a controller independently operable to interrupt power conditions and introduce rheostatic braking irrespective of the position of the power controller, a contactor energized by the braking controller to close the circuit for rheostatically braking the motor, auxiliary contacts on the braking contactor which interrupt certain of the power operating circuits established by the power controller, and additional auxiliary contacts on the braking contactor cooperating with the power controller to complete a circuit in parallel with the braking controller for maintaining the braking contactor energized.

5. Means for controlling an electric traction motor comprising, in combination, a power controller for establishing power operating circuits, a controller independently operable to interrupt power conditions and introduce rheostatic braking irrespective of the position of the power controller, a contactor energized by the braking controller to close the circuit for rheostatically braking the motor, auxiliary contacts on the braking contactor which interrupt certain of the power operating circuits established by the power controller, additional auxiliary contacts on the braking contactor cooperating with the power controller to complete a circuit in parallel with the braking controller for maintaining the braking contactor energized, and contacts on the brake controller for also interrupting the said power operating circuits which are interrupted by auxiliary contacts on the brake contactor.

6. Means for controlling an electric traction motor comprising, in combination, a power controller for establishing power operating circuits, a controller independently operable to interrupt power conditions and introduce rheostatic braking irrespective of the position of the power controller, a contactor energized by the braking controller to close the circuit for rheostatically braking the motor, auxiliary contacts on the braking contactor which interrupt certain of the power operating circuits established by the power controller, and additional auxiliary contacts on the braking contactor cooperating with the power controller to complete a circuit in parallel with the braking controller for maintaining the braking contactor energized, said power controller comprising two electrically separate parts, one part being adapted to close the maintaining circuit of the brake contactor and to complete, in parallel with the brake controller, those operating circuits which are utilized during both power operation and rheostatic braking, and the other part, which is rendered inoperative by the said interrupting contacts during rheostatic braking, being adapted to complete those operating circuits which are utilized only for power operation.

7. Means for controlling an electric traction motor comprising, in combination, a power controller for establishing power operating circuits, a controller independently operable to interrupt power conditions and introduce rheostatic braking irrespective of the position of the power controller, a contactor energized by the braking controller to close the circuit for rheostatically braking the motor, auxiliary contacts on the braking contactor which interrupt certain of the power operating circuits established by the power controller, and additional auxiliary contacts on the braking contactor cooperating with the power controller to complete a circuit in parallel with the braking controller for maintaining the braking contactor energized, said power controller being of the drum type and comprising a set of associated contact fingers of which one is energized through the said interrupting contacts, a set of contacts on the movable drum adapted to make connections between the latter finger and the others of the set, a second set of contact fingers of which one is energized independently of said interrupting contacts, and a second set of drum contacts adapted to make connections between the latter finger and the others of the second set.

PAUL LESTER MARDIS.
ERIC ALTON BINNEY.